(12) United States Patent
Byun

(10) Patent No.: US 11,807,254 B2
(45) Date of Patent: Nov. 7, 2023

(54) APPARATUS PROVIDING A WIPER FAIL-SAFE MODE, A SYSTEM HAVING THE SAME, AND A METHOD THEREOF

(71) Applicants: HYUNDAI MOTOR COMPANY, Seoul (KR); KIA CORPORATION, Seoul (KR)

(72) Inventor: Seok Ju Byun, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 283 days.

(21) Appl. No.: 17/323,773

(22) Filed: May 18, 2021

(65) Prior Publication Data

US 2022/0135058 A1 May 5, 2022

(30) Foreign Application Priority Data

Nov. 3, 2020 (KR) .......................... 10-2020-0145553

(51) Int. Cl.
```
B60W 50/00      (2006.01)
B60W 50/038     (2012.01)
G07C 5/08       (2006.01)
B60W 50/14      (2020.01)
B60W 50/02      (2012.01)
B60S 1/08       (2006.01)
```

(52) U.S. Cl.
CPC ......... *B60W 50/038* (2013.01); *B60S 1/0818* (2013.01); *B60W 50/0205* (2013.01); *B60W 50/14* (2013.01); *G07C 5/0808* (2013.01); *G07C 5/0825* (2013.01); *G07C 5/0833* (2013.01); *B60W 2050/0215* (2013.01)

(58) Field of Classification Search
CPC .......... B60W 50/038; B60W 50/0205; B60W 50/14; B60W 2050/0215; B60S 1/0818; B60S 1/08; G07C 5/0808; G07C 5/0825; G07C 5/0833; G07C 5/0816; B60R 16/0232
See application file for complete search history.

(56) References Cited

U.S. PATENT DOCUMENTS

2018/0178761 A1* 6/2018 Uno .......................... B60Q 9/00

\* cited by examiner

*Primary Examiner* — Michael V Kerrigan
(74) *Attorney, Agent, or Firm* — LEMPIA SUMMERFIELD KATZ LLC

(57) ABSTRACT

An apparatus providing a wiper fail-safe mode, a system having the same, and a method thereof identify the occurrence of a wiper system failure and notify the driver of the occurrence of the failure. The system includes a wiper control module that is connected with at least one of a wiper and a rain sensor and outputs at least one of location information of the wiper and failure information of the rain sensor. The system includes an apparatus providing a wiper fail-safe mode that identifies a failure of a wiper system based on at least one of state information of a wiper switch, the state information being received from the wiper switch, the location information of the wiper, the location information being received from the wiper control module, or the failure information of the rain sensor and outputs a notification of the failure of the wiper system.

17 Claims, 6 Drawing Sheets

APPARATUS PROVIDING A WIPER FAIL-SAFE MODE, A SYSTEM HAVING THE SAME, AND A METHOD THEREOF

CROSS-REFERENCE TO RELATED APPLICATION

This application claims the benefit of priority to Korean Patent Application No. 10-2020-0145553, filed in the Korean Intellectual Property Office on Nov. 3, 2020, the entire contents of which are incorporated herein by reference.

TECHNICAL FIELD

The present disclosure relates to an apparatus that provides a wiper fail-safe mode, i.e. a wiper fail-safe mode providing apparatus, a system having the same, and a method thereof. More particularly, the present disclosure relates to a wiper fail-safe mode providing apparatus for identifying the occurrence of a failure of a wiper system and notifying a driver of the occurrence of the failure of the wiper system to prevent an accident. The present disclosure also relates to a system having the same and a method thereof.

BACKGROUND

In an electronic control wiper system, around a body control unit (BCM) playing a role as a master, a wiper and a rain sensor may be connected with each other through local interconnect network (LIN) communication and a multi-function switch (MF SW) may be connected through controller area network (CAN) communication. The MF SW may adjust operation modes of the wiper, including a mist mode wiping the window once, an auto mode automatically wiping the window by the rain sensor, a low mode wiping the window at 45 rpm, and a high mode wiping the window at 65 rpm.

When the MF SW fails due to a failure situation of the BCM, disconnection of CAN communication, disconnection of LIN communication, or abnormality of the MF SW, the wiper operation stops operation and it is possible for the MF SW to operate only in the low mode for customer safety. In this case, the low mode may be configured to compulsorily supply ignition 2 (IGN2) power to the wiper through a physical MF SW contact point to perform a minimum wiper operation for an MF SW, BCM, rain sensor, or communication error.

However, when the operation of the wiper stops, because the wiper fails while the wiper operates in the high mode by the amount of heavy rain in the MF SW auto mode or the MF SW high mode, there is a high probability that a customer will not recognize that he or she should move the MF SW to the low mode to perform a minimum of wiper operation. Thus, there is a need for technology or a solution providing a wiper fail-safe mode to prevent it.

SUMMARY

The present disclosure has been made to solve the above-mentioned problems occurring in the prior art while advantages achieved by the prior art are maintained intact.

An aspect of the present disclosure provides an apparatus that provides a wiper fail-safe mode, i.e. a wiper fail-safe mode providing apparatus, a system having the same, and a method thereof.

Another aspect of the present disclosure provides a wiper fail-safe mode providing apparatus, a system having the same, and a method thereof for identifying a failure of a wiper system based on at least one of state information of a wiper switch, location information of a wiper, failure information of a rain sensor, or failure information of communication.

Another aspect of the present disclosure provides a wiper fail-safe mode providing apparatus, a system having the same, and a method thereof for controlling a wiper to operate in an operation mode of the wiper before failure during a certain time, when the failure of the wiper system is identified.

Another aspect of the present disclosure provides a wiper fail-safe mode providing apparatus, a system having the same, and a method thereof for outputting a notification including the contents that it is possible for a wiper system to operate only in a low operation mode, when the failure of the wiper system is identified in a state where the wiper does not operate.

Another aspect of the present disclosure provides a wiper fail-safe mode providing apparatus, a system having the same, and a method thereof for outputting a notification including contents requesting to change an operation mode of a wiper within a certain time, when the failure of the wiper system is identified in a state where the wiper operates and when the operation mode of the wiper is not a low mode.

The technical problems to be solved by the present disclosure are not limited to the aforementioned problems. Any other technical problems not mentioned herein should be clearly understood from the following description by those having ordinary skill in the art to which the present disclosure pertains.

According to an aspect of the present disclosure, a wiper fail-safe mode providing apparatus may include a communication device that receives state information of a wiper switch from the wiper switch and receives location information of a wiper from a wiper control module connected with the wiper. The apparatus may further include a controller that identifies a failure of a wiper system based on at least one of the state information of the wiper switch or the location information of the wiper, the state information and the location information being received by the communication device. The apparatus may further include a notification device that outputs a notification of the failure of the wiper system, depending on the failure of the wiper system.

In an embodiment, the notification device may include at least one of a cluster or an audio, video, navigation (AVN).

In an embodiment, the controller may identify the failure of the wiper system, depending on at least one of whether the state information of the wiper switch is periodically received via the communication device, whether it is impossible to receive the state information via the communication device, or whether the location information of the wiper is periodically received via the communication device.

In an embodiment, the controller may transmit a command including contents controlling the wiper to operate in an operation mode of the wiper before the failure during a certain time to the wiper control module via the communication device, when the failure of the wiper system is identified.

In an embodiment, the controller may output a notification including the contents that it is possible for the wiper system to operate only in a low operation mode, via the notification device, when the failure of the wiper system is identified in a state where the wiper does not operate. The controller may output a notification including contents requesting to change an operation mode of the wiper within the certain time, via the notification device, when the operation mode of the wiper is not the low mode, when the failure of the wiper system is identified in a state where the wiper operates.

In an embodiment, the controller may output a notification including the contents that the wiper stops because there is no change in the operation mode, via the notification device, when there is no change in the operation node during the certain time, when the failure of the wiper system is identified in the state where the wiper operates and when the operation mode of the wiper is not the low mode. The controller may transmit a command including contents stopping the wiper to the wiper control module, via the communication device.

According to another aspect of the present disclosure, a wiper fail-safe mode providing system may include a wiper control module that is connected with at least one of a wiper or a rain sensor and may output at least one of location information of the wiper and failure information of the rain sensor. The system may further include a wiper fail-safe mode providing apparatus that identifies a failure of a wiper system based on at least one of state information of a wiper switch, the state information being received from the wiper switch, the location information of the wiper, the location information being received from the wiper control module, or the failure information of the rain sensor. The wiper fail-safe mode providing apparatus may output a notification of the failure of the wiper system.

In an embodiment, the wiper control module may output failure information of communication connected with at least one of the wiper or the rain sensor. The wiper fail-safe mode providing apparatus may identify the failure of the wiper system depending on the failure information of the communication.

In an embodiment, the wiper fail-safe mode providing apparatus may identify the failure of the wiper system, depending on at least one of whether the state information of the wiper switch is periodically received, whether it is impossible to receive the state information, or whether the location information of the wiper is periodically received.

In an embodiment, the wiper control module may control the wiper to operate in an operation mode of the wiper before the failure during a certain time, when the failure of the wiper system is identified.

In an embodiment, the wiper fail-safe mode providing apparatus may output a notification including the contents that it is possible for the wiper system to operate only in a low operation mode, when the failure of the wiper system is identified in a state where the wiper does not operate. The wiper fail-safe mode providing apparatus may output a notification including contents requesting to change an operation mode of the wiper within the certain time when the operation mode of the wiper is not a low mode, when the failure of the wiper system is identified in a state where the wiper operates.

In an embodiment, the wiper fail-safe mode providing apparatus may output a notification including contents requesting to change the operation mode to the low mode or a high mode, when a failure of the rain sensor is identified and when the operation mode is an auto mode.

In an embodiment, the wiper fail-safe mode providing apparatus may output a notification including contents requesting to change the operation mode to the low mode, when a failure of the rain sensor is not identified.

In an embodiment, the wiper fail-safe mode providing apparatus may output a notification including the contents that the wiper stops because there is no change in the operation mode, when there is no change in the operation mode during the certain time. The wiper control module may stop the wiper, when there is no change in the operation mode during the certain time.

According to another aspect of the present disclosure, a wiper fail-safe mode providing method may include receiving state information of a wiper switch from the wiper switch and receiving location information of a wiper from a wiper control module connected with the wiper. The method may further include identifying a failure of a wiper system based on at least one of the state information of the wiper switch or the location information of the wiper. The method may further include outputting a notification of the failure of the wiper system, depending on the failure of the wiper system.

In an embodiment, the identifying of the failure of the wiper system based on the at least one of the state information of the wiper switch or the location information of the wiper may include identifying the failure of the wiper system, depending on at least one of whether the state information of the wiper switch is periodically received, whether it is impossible to receive the state information, or whether the location information of the wiper is periodically received.

In an embodiment, the wiper fail-safe mode providing method may further include controlling the wiper to operate in an operation mode of the wiper before the failure during a certain time, when the failure of the wiper system is identified.

In an embodiment, the outputting of the notification of the failure of the wiper system depending on the failure of the wiper system may include outputting a notification including the contents that it is possible for the wiper system to operate only in a low operation mode, when the failure of the wiper system is identified in a state where the wiper does not operate. The outputting of the notification of the failure of the wiper system depending on the failure of the wiper system may also include outputting a notification including contents requesting to change an operation mode of the wiper within the certain time when the operation mode of the wiper is not a low mode, when the failure of the wiper system is identified in a state where the wiper operates.

In an embodiment, the wiper fail-safe mode providing method may further include obtaining failure information of a rain sensor. The identifying of the failure of the wiper system based on the at least one of the state information of the wiper switch or the location information of the wiper may include identifying the failure of the wiper system based on failure information of the rain sensor.

In an embodiment, the wiper fail-safe mode providing method may further include outputting a notification including the contents that the wiper stops because there is no change in the operation mode, when there no change in the operation node during the certain time, when the failure of the wiper system is identified in the state where the wiper operates, and when the operation mode of the wiper is not the low mode, and may further include stopping the wiper.

BRIEF DESCRIPTION OF THE DRAWINGS

The above and other objects, features and advantages of the present disclosure should be more apparent from the following detailed description taken in conjunction with the accompanying drawings.

DETAILED DESCRIPTION

Figure 1:
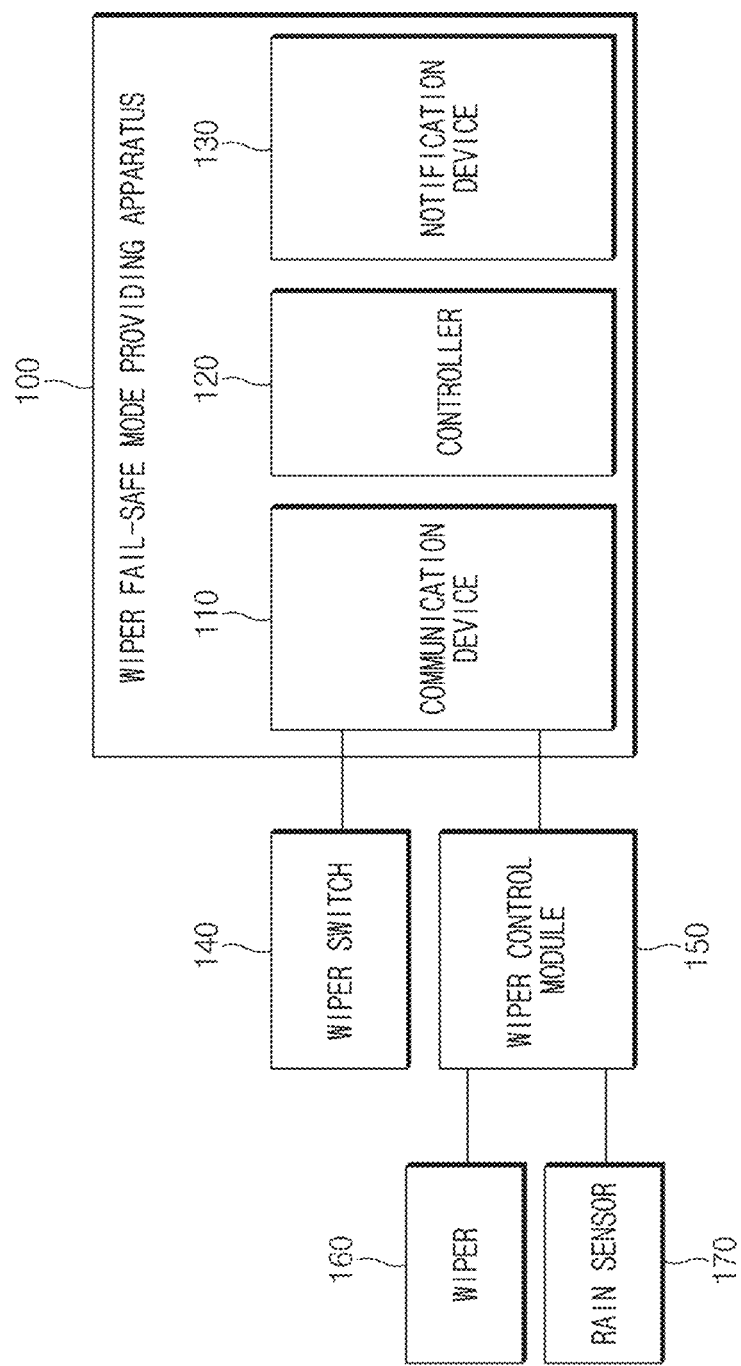
FIG. 1 is a block diagram illustrating a wiper fail-safe mode providing apparatus according to an embodiment of the present disclosure.

Hereinafter, some embodiments of the present disclosure are described in detail with reference to the drawings. In adding the reference numerals to the components of each drawing, it should be noted that the identical or equivalent component is designated by the identical numeral even when they are displayed on other drawings. Further, in describing the embodiment of the present disclosure, a detailed description of well-known features or functions has been omitted in order not to unnecessarily obscure the gist of the present disclosure.

In describing the components of the embodiment according to the present disclosure, terms such as first, second, "A", "B", (a), (b), and the like may be used. These terms are merely intended to distinguish one component from another component. The terms do not limit the nature, sequence, or order of the constituent components. Unless otherwise defined, all terms used herein, including technical or scientific terms, have the same meanings as those generally understood by those having ordinary skill in the art to which the present disclosure pertains. Such terms as those defined in a generally used dictionary are to be interpreted as having meanings equal to the contextual meanings in the relevant field of art. Such terms are not to be interpreted as having ideal or excessively formal meanings unless clearly defined as having such in the present application.

Hereinafter, embodiments of the present disclosure are described in detail with reference to FIGS. 1-6. When a component, device, element, or the like of the present disclosure is described as having a purpose or performing an operation, function, or the like, the component, device, or element should be considered herein as being "configured to" meet that purpose or to perform that operation or function. Further, the controller described herein may include a processor programmed to perform the noted operations, functions, or the like.

FIG. 1 is a block diagram illustrating an apparatus that provides a wiper fail-safe mode, i.e. a wiper fail-safe mode providing apparatus according to an embodiment of the present disclosure.

Referring to FIG. 1, a wiper fail-safe mode providing apparatus 100 may be implemented to include a communication device 110, a controller 120, and a notification device 130.

As an example, the wiper fail-safe mode providing apparatus 100 may be provided in a vehicle or may be implemented as a configuration independent of the vehicle in the form of being installed/added to the vehicle.

The wiper fail-safe mode providing apparatus 100 may be implemented to be connected with at least one of a wiper switch 140 or a wiper control module 150 through the communication device 110.

Referring to FIG. 1, the communication device 110 may communicate with at least one of the wiper switch 140 or the wiper control module 150.

As an example, the communication device 110 may be implemented to be directly or indirectly connected with at least one of the wiper switch 140 or the wiper control module 150 in a wireless or wired manner.

The communication device 110 may receive state information of the wiper switch 140 from the wiper switch 140 and may receive location information of a wiper 160 from the wiper control module 150 connected with the wiper 160.

As an example, the communication device 110 may receive state information of the wiper switch 140 through controller area network (CAN) communication from the wiper switch 140.

As an example, the communication device 110 may receive location information of the wiper 160 through CAN communication from the wiper control module 150.

The controller 120 may electrically control respective components of the vehicle. In addition, the controller 120 may perform a variety of data processing, calculation, and the like described below.

As an example, the controller 120 may be implemented to be included in a control module of the vehicle or may be implemented independently of the control module of the vehicle.

The controller 120 may be connected with at least one of the communication device 110 or the notification device 130 in a wireless or wired manner and may directly or indirectly control at least one of the communication device 110 or the notification device 130.

The controller 120 may identify a failure of the wiper system based on at least one of the state information of the wiper switch 140 or the location information of the wiper 160, which is received from the communication device 110.

The controller 120 may identify the failure of the wiper system depending on at least one of whether the state information of the wiper switch 140 is periodically received via the communication device 110, whether it is impossible to receive the state information via the communication device 110, or whether the location information of the wiper 160 is periodically received via the communication device 110.

When the failure of the wiper system is identified, the controller 120 may transmit a command, including contents controlling to operate the wiper 160 in an operation mode of the wiper 160 before the failure during a certain time, to the wiper control module 150 via the communication device 110.

When the failure of the wiper system is identified in a state where the wiper 160 does not operate, the controller 120 may output a notification including the contents that it is possible for the wiper system to operate only in a low operation mode by means of the notification device 130.

When the failure of the wiper system is identified in a state where the wiper 160 operates and when an operation mode of the wiper 160 is not a low mode, the controller 120 may output a notification including contents requesting to change the operation mode within a certain time by means of the notification device 130.

When the failure of the wiper system is identified in the state where the wiper 160 operates, when the operation mode of the wiper 160 is not the low mode, and when there is no change in operation mode during the certain time, the controller 120 may output a notification including the contents that the wiper 160 stops because there is no change in the operation mode, through the notification device 130. The controller 120 may transmit a command including contents stopping the wiper 160 to the wiper control module 150, via the communication device 110.

The notification device 130 may include a display or a voice output device and may visually or audibly output a notification of a wiper failure.

The notification device 130 may include at least one of a cluster or an audio, video, navigation (AVN).

The notification device 130 may output notifications distinguished from each other in response to the failure of the wiper system, depending on the failure of the wiper system.

The wiper switch 140 may be connected with the communication device 110 to transmit at least one of state information of the wiper switch 140 or location information of the wiper 160 to the communication device 110.

The wiper switch 140 may be implemented to include a multi-function switch (MF SW).

As an example, the state information of the wiper switch 140 may include an operation mode of the wiper 160.

As an example, the operation mode of the wiper 160 may include at least one of an off mode, a low mode, a high mode, a mist mode, or an auto mode.

The wiper switch 140 may be connected with the wiper control module 150 to transmit state information of the wiper switch 140 to the wiper control module 150.

The wiper control module 150 may be implemented to include a body control module (BCM).

Referring to FIG. 1, the wiper control module 150 may be connected with at least one of the wiper 160 or a rain sensor 170.

The wiper control module 150 may control the wiper 160 in the low mode or the high mode based on information about the amount of rain, which is received from the rain sensor 170.

As an example, the wiper control module 150 may deliver a control signal to the wiper 160 to control the wiper 160 at a low or high speed.

When the failure of the wiper system is identified, the wiper control module 150 may control the wiper 160 to operate in an operation mode of the wiper 160 before the failure during a certain time.

When there is no change in operation mode during a certain time, the wiper control module 150 may stop the wiper 160.

The wiper 160 may be connected with the wiper control module 150 to transmit location information of the wiper 160 to the wiper control module 150.

The rain sensor 170 may be provided in a wind shield of the vehicle, may detect the amount of rain, and may transmit information about the amount of rain to the wiper control module 150.

As an example, when the operation mode of the wiper 160 is the auto mode, the rain sensor 170 may transmit information about the amount of rain to the wiper control module 150, and the wiper control module 150 may output a low or high speed control command of the wiper 160 based on the information about the amount of rain.

The rain sensor 170 may transmit failure information of the rain sensor 170 to the wiper control module 150.

Figure 2:
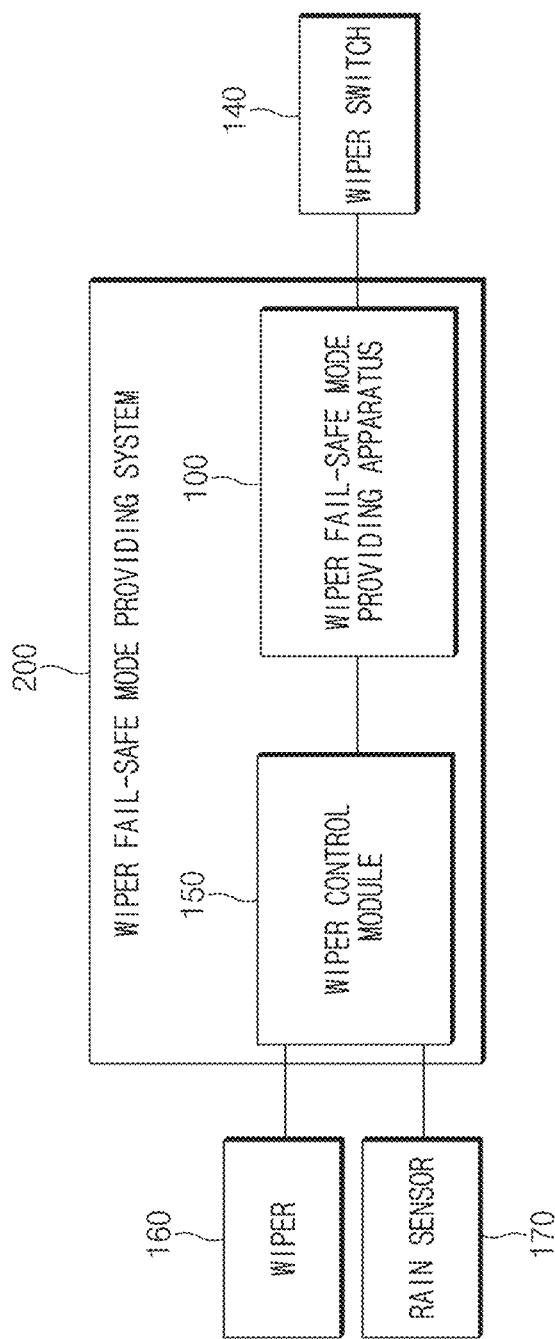
FIG. 2 is a block diagram illustrating a wiper fail-safe mode providing system according to an embodiment of the present disclosure.

FIG. 2 is a block diagram illustrating a wiper fail-safe mode providing system according to an embodiment of the present disclosure.

Referring to FIG. 2, a system that provides a wiper fail-safe mode, i.e. a wiper fail-safe mode providing system 200 may be implemented to include a wiper control module 150 and a wiper fail-safe mode providing apparatus 100.

The wiper fail-safe mode providing system 200 may be implemented to be provided in the vehicle or may be implemented in a form where a part thereof is provided in the vehicle and the other is a separate configuration independent of the vehicle to be installed/attached to the vehicle.

The wiper control module 150 may output at least one of location information of a wiper 160 or failure information of a rain sensor 170.

The wiper control module 150 may output failure information of communication connected with at least one of the wiper 160 or the rain sensor 170.

As an example, the wiper control module 150 may be connected with at least one of the wiper 160 or the rain sensor 170 through local interconnect network (LIN) communication to output failure information of the LIN communication.

As an example, when a signal is not received from at least one of the wiper 160 or the rain sensor 170, the wiper control module 150 may output failure information of communication connected with at least one of the wiper 160 or the rain sensor 170.

The wiper fail-safe mode providing apparatus 100 may include, as shown in FIG. 1, a communication device 110, a controller 120, and a notification device 130. Thus, the wiper fail-safe mode providing apparatus 100 included in the wiper fail-safe mode providing system 200 may include, as described with reference to FIG. 1, the technical features described above in the same manner, by means of at least one of the communication device 110, the controller 120, or the notification device 130.

The wiper fail-safe mode providing apparatus 100 may identify a failure of a wiper system based on at least one of state information of the wiper switch 140, which is received from the wiper switch 140, location information of the wiper 160, which is received from the wiper control module 150, or failure information of the rain sensor 170 and may output a notification of the failure of the wiper system.

As an example, the wiper fail-safe mode providing apparatus 100 may receive at least one of state information of the wiper switch 140, location information of the wiper 160, or failure information of the rain sensor 170 via the communication device 110.

As an example, the wiper fail-safe mode providing apparatus 100 may identify a failure of the wiper system based on at least one of the state information of the wiper switch 140, the location information of the wiper 160, or the failure information of the rain sensor 170 by means of the controller 120.

As an example, the wiper fail-safe mode providing apparatus 100 may output a notification of the failure of the wiper system by means of the notification device 130.

The wiper fail-safe mode providing apparatus 100 may identify a failure of the wiper system depending on failure information of communication connected with at least one of the wiper 160 or the rain sensor 170.

As an example, the wiper fail-safe mode providing apparatus 100 may receive failure information of communication connected with at least one of the wiper 160 or the rain sensor 170 via the communication device 110 and may identify a failure of the wiper system depending on the received failure information of the communication by means of the controller 120.

When the failure of the rain sensor 170 is identified and when the operation mode is an auto mode, the wiper fail-safe mode providing apparatus 100 may output a notification including contents requesting to change the operation mode to a low mode or a high mode.

When the failure of the rain sensor 170 is not identified, the wiper fail-safe mode providing apparatus 100 may output a notification including contents requesting to change the operation mode to the low mode.

As an example, when the failure of the wiper system is identified in a part different from the rain sensor 170, the wiper fail-safe mode providing apparatus 100 may output a notification including contents requesting to change the operation mode to the low mode.

Figure 3:
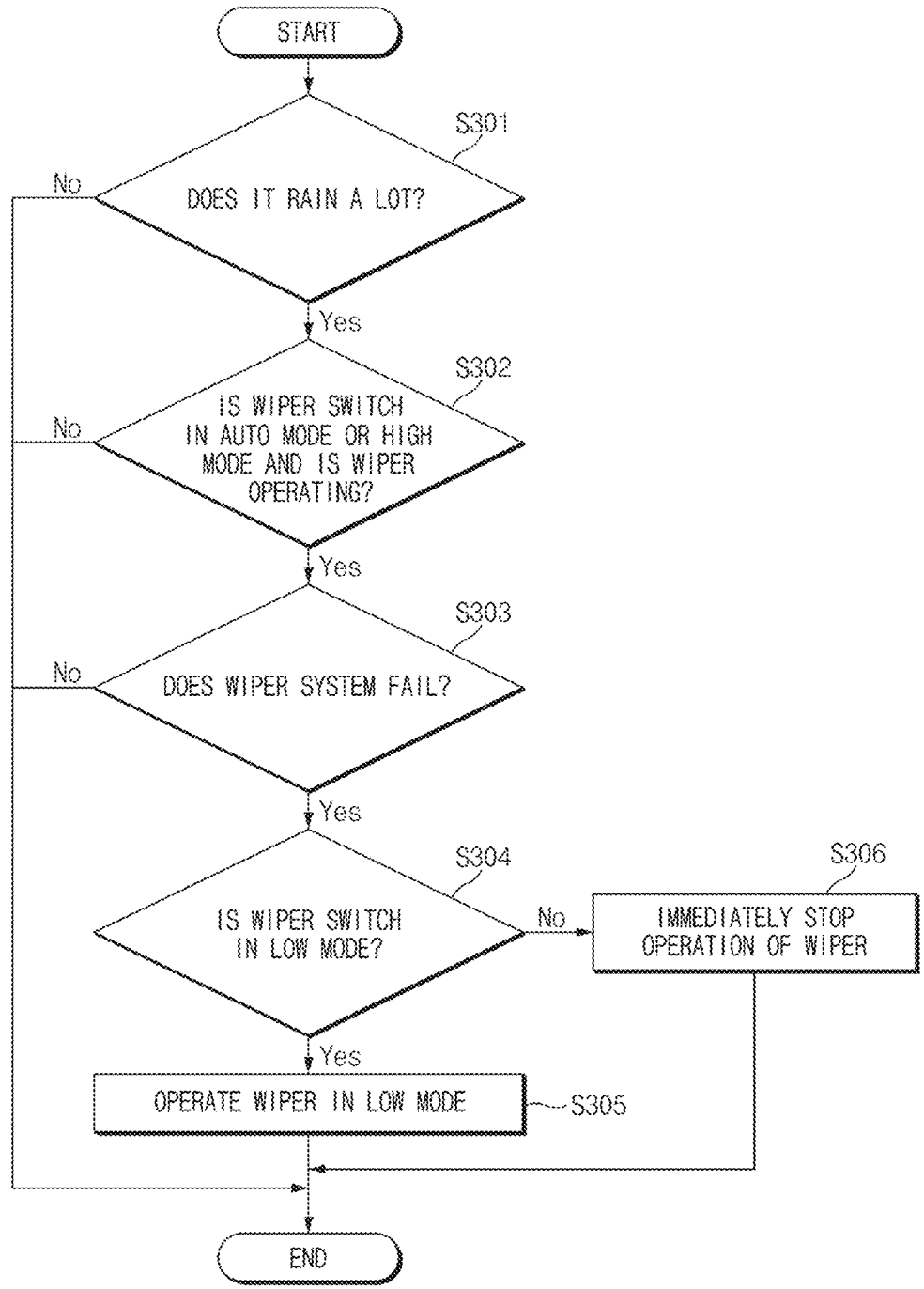
FIG. 3 is a flowchart illustrating an existing technology associated with an embodiment of the present disclosure.

FIG. 3 is a flowchart illustrating an existing technology associated with an embodiment of the present disclosure.

First of all, prior to determining a failure of a wiper system, in S301, the existing technology may determine whether it rains a lot.

As an example, when a wiper switch is in an auto mode, the existing technology may detect the amount of rain by means of a rain sensor of a vehicle and may determine that it rains a lot when the amount of rain is greater than a reference value. When the wiper switch is in the auto mode, the existing technology may provide a signal to operate in a low or high mode, intermittently depending on the amount of rain.

In S302, the existing technology may determine whether the wiper switch is in the auto mode or a high mode and the wiper is operating.

As an example, the existing technology may receive state information of the wiper switch from the wiper switch to determine whether the wiper switch is in the auto mode or the high mode. The existing technology may receive location information of the wiper from a wiper control module to determine whether the wiper is operating.

When it is determined that the wiper switch is in the auto mode or the high mode and the wiper is operating, in S303, the existing technology may determine whether the wiper system fails.

When it is determined that the wiper system fails, in S304, the existing technology may determine whether the wiper switch is in a low mode.

When it is determined that the wiper switch is in the low mode, in S305, the existing technology may operate the wiper in the low mode.

When it is determined that the wiper switch is not in the low mode, in S306, the existing technology may immediately stop the operation of the wiper.

Herein, when the operation of the wiper is immediately stopped, as it rains a lot, there is a high probability that the existing technology will cause an accident, because the view of a driver is obscured. In this case, the low mode may be configured to compulsorily supply ignition 2 (IGN2) power to the wiper through a physical MF SW contact point to perform a minimum wiper operation for an MF SW, BCM, rain sensor, or communication failure.

Thus, when the operation of the wiper is immediately stopped, the MF SW may be adjusted to the low mode to perform a minimum wiper operation. However, the driver may not recognize it, thus leading to an accident.

To prevent this, there is a need for a wiper fail-safe mode providing apparatus, a system having the same, and a method thereof, according to an embodiment of the present disclosure.

Figure 4:
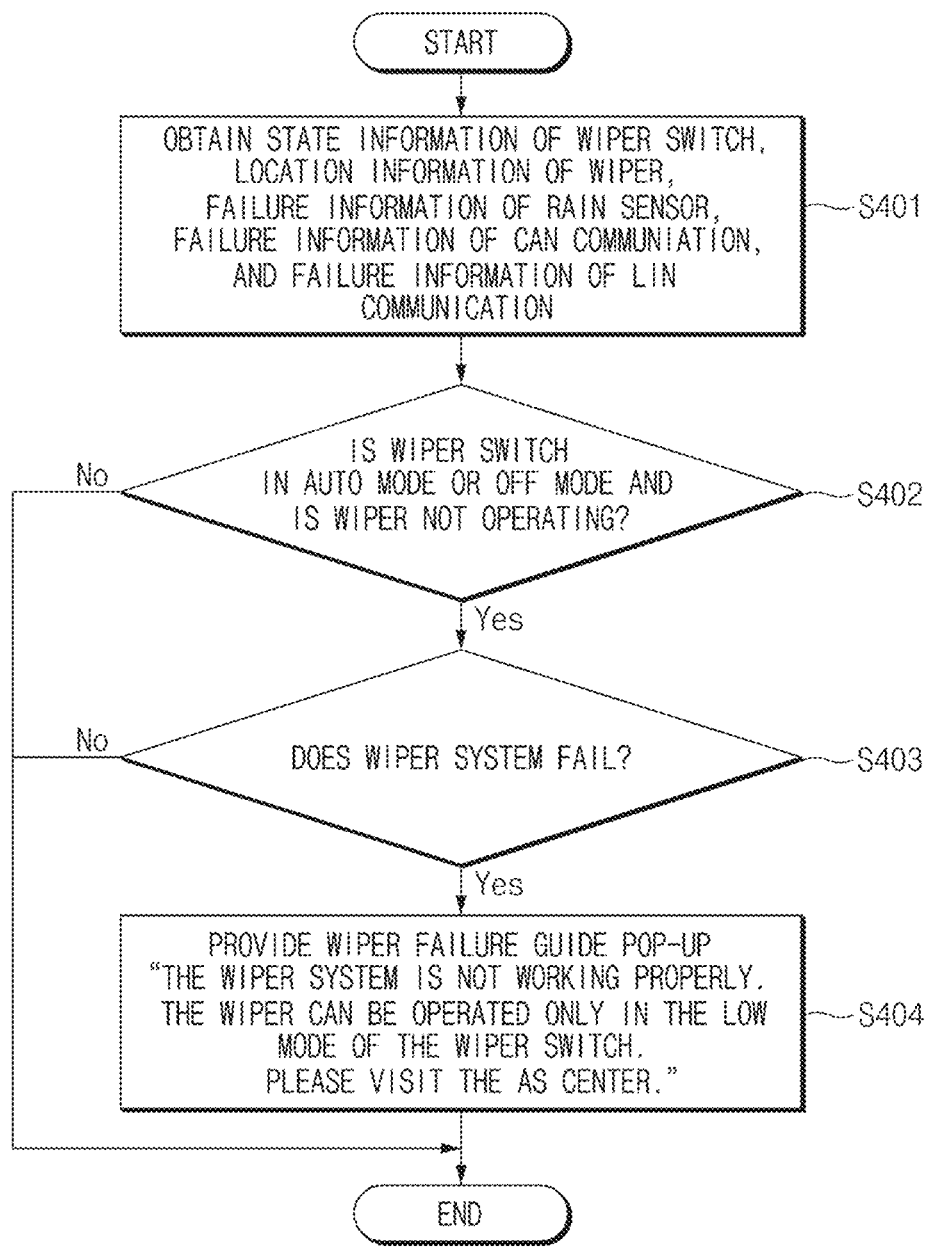
FIG. 4 is a flowchart illustrating an operation of a wiper fail-safe mode providing system according to an embodiment of the present disclosure, while the wiper stops.

FIG. 4 is a flowchart illustrating an operation of a wiper fail-safe mode providing system according to an embodiment of the present disclosure while a wiper stops.

According to FIG. 4, first of all, in S401, a wiper fail-safe mode providing system 200 may obtain at least one of state information of a wiper switch 140, location information of a wiper 160, failure information of a rain sensor 170, failure information of CAN communication, or failure information of LIN communication.

When obtaining the at least one of the state information of the wiper switch 140, the location information of the wiper 160, the failure information of the rain sensor 170, the failure information of the CAN communication, or the failure information of the LIN communication, in S402, the wiper fail-safe mode providing system 200 may determine whether the wiper switch 140 is an auto mode or an off mode and the wiper 160 is not operating.

As an example, the wiper fail-safe mode providing system 200 may determine whether the wiper 160 is operating using the location information of the wiper 160.

When it is determined that the wiper switch 140 is the auto mode or the off mode and the wiper 160 is not operating, in S403, the wiper fail-safe mode providing system 200 may determine whether a wiper system fails.

Meanwhile, although not illustrated in the drawing, as another embodiment, the wiper fail-safe mode providing system 200 may first determine whether the wiper system fails in S403. The wiper fail-safe mode providing system 200 may then determine whether the wiper switch 140 is in the auto mode or the off mode and the wiper 160 is not operating in S402 or may perform S403 and S402 at the same time.

When it is determined that the wiper system fails, in S404, the wiper fail-safe mode providing system 200 may output a wiper failure guide pop-up providing guidance on the contents "The wiper system is not working properly. The wiper can be operated only in the low mode of the wiper switch. Please visit the A/S Center."

Here, the contents "The wiper system is not working properly. The wiper can be operated only in the low mode of the wiper switch. Please visit the A/S Center." are included as text merely for illustration. The text may include at least one of contents providing a notification of a failure of the wiper system, contents that the wiper 160 may be operated only when the wiper switch 140 is in the low mode, or contents requesting to visit the A/S Center, when it is really implemented.

Figure 5:
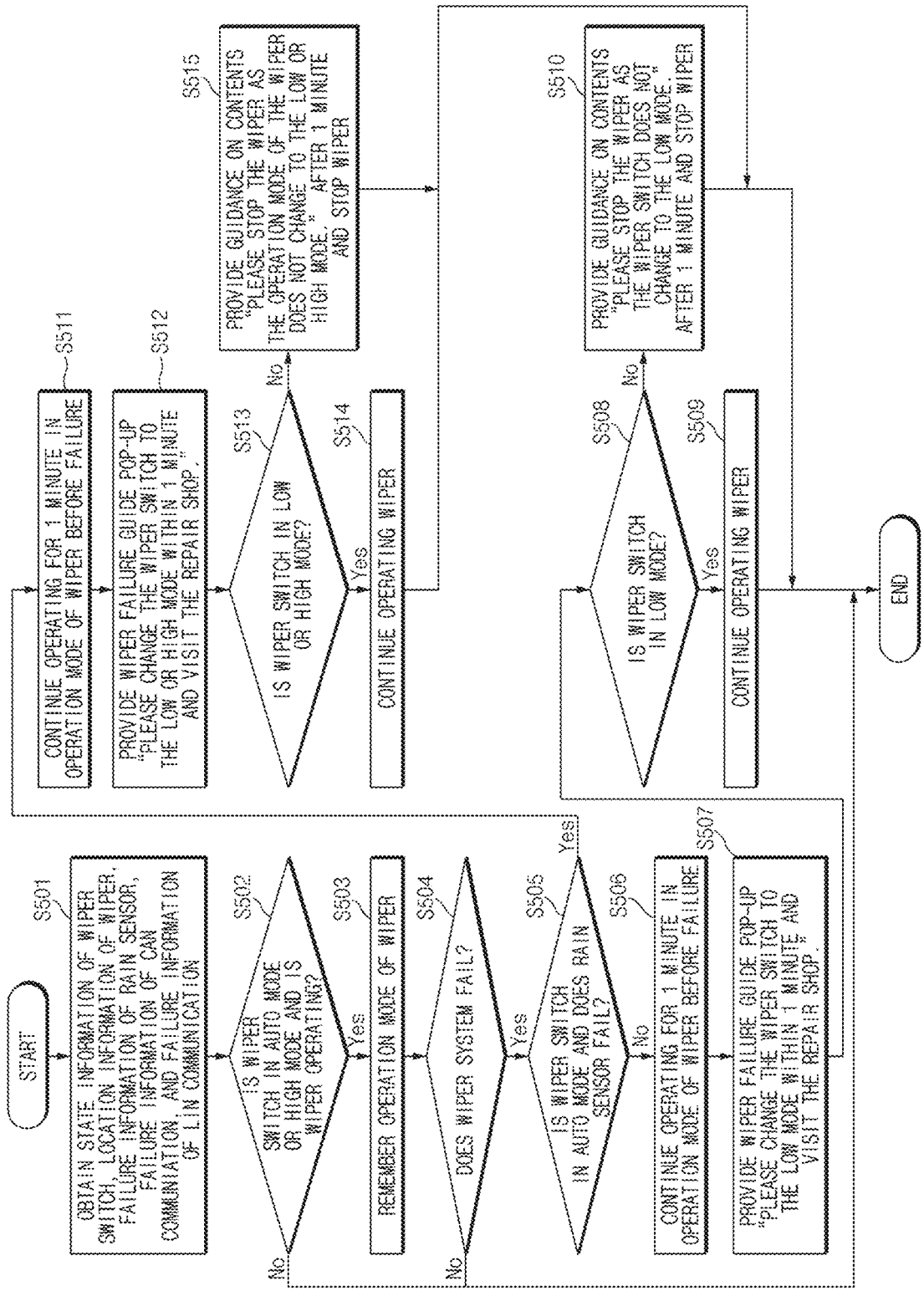
FIG. 5 is a flowchart illustrating an operation of a wiper fail-safe mode providing system according to an embodiment of the present disclosure, while the wiper operates.

FIG. 5 is a flowchart illustrating an operation of a wiper fail-safe mode providing system according to an embodiment of the present disclosure, while the wiper operates.

According to FIG. 5, first of all, in S501, a wiper fail-safe mode providing system 200 may obtain at least one of state information of a wiper switch 140, location information of a wiper 160, failure information of a rain sensor 170, failure information of CAN communication, or failure information of LIN communication.

As an example, the wiper fail-safe mode providing system 200 may obtain the failure information of the CAN communication depending on whether a wiper fail-safe mode providing apparatus 100 does not receive the state information of the wiper switch 140 during a certain time.

When obtaining the at least one of the state information of the wiper switch 140, the location information of the wiper 160, the failure information of the rain sensor 170, the failure information of the CAN communication, or the failure information of the LIN communication, in S502, the wiper fail-safe mode providing system 200 may determine whether the wiper switch 140 is an auto mode or a high mode and the wiper 160 is operating.

As an example, the wiper fail-safe mode providing system 200 may determine whether the wiper 160 is operating using the location information of the wiper 160.

When it is determined that the wiper switch 140 is the auto mode or the high mode and the wiper 160 is operating, in S503, the wiper fail-safe mode providing system 200 may remember an operation mode of the wiper 160.

As an example, the wiper fail-safe mode providing system 200 may store and remember an operation mode of the wiper 160 in a volatile or non-volatile memory in real time.

After remembering the operation mode of the wiper 160, in S504, the wiper fail-safe mode providing system 200 may determine whether the wiper system fails.

Meanwhile, although not illustrated in the drawing, as another embodiment, the wiper fail-safe mode providing system 200 may implement the process (S502) of determining whether the wiper switch 140 is in the auto mode or the high mode and the wiper 160 is operating, the process (S503) of remembering the operation mode of the wiper 160, and the process (S504) of determining whether the wiper system fails in a different order or at the same time.

When it is determined that the wiper system fails, in S505, the wiper fail-safe mode providing system 200 may determine whether the wiper switch 140 is in the auto mode and the rain sensor 170 fails.

When the wiper switch 140 is not in the auto mode or when it is not determined that the rain sensor 170 fails, in S506, the wiper fail-safe mode providing system 200 may continue operating the wiper 160 for 1 minute in an operation mode of the wiper 160 before the failure.

Herein, the numerical value called "1 minute" is used for illustration but may instead be a value set randomly. The numerical value may be determined as a difference numerical value or may be determined by being received from a user, when actually implemented.

After continuing operating the wiper 160 for 1 minute in the operation mode of the wiper 160 before the failure, in S507, the wiper fail-safe mode providing system 200 may output a wiper failure guide pop-up of the contents "Please change the wiper switch to the low mode within 1 minute and visit the repair shop."

Here again, the numerical value called "1 minute" is used for illustration but may instead be a value set randomly. The numerical value may be determined as a difference numerical value or may be determined by being received from a user, when actually implemented.

Herein, the contents "Please change the wiper switch to the low mode within 1 minute and visit the repair shop." are included as text merely for illustration. The text may include at least one of contents requesting to change the wiper switch 140 to the low mode within a certain time and contents requesting to visit the A/S Center, when actually implemented.

Meanwhile, although not illustrated in the drawing, as another embodiment, the wiper fail-safe mode providing system 200 may first output the wiper failure guide pop-up of the contents "Please change the wiper switch to the low mode within 1 minute and visit the repair shop" in S507. The wiper fail-safe mode providing system 200 may then continue operating the wiper 160 for 1 minute in the operation mode of the wiper 160 before the failure in S506 or may proceed with the two processes at the same time.

After outputting the wiper failure guide pop-up, in S508, the wiper fail-safe mode providing system 200 may determine whether the wiper switch 140 is in the low mode.

When it is determined that the wiper switch 140 in in the low mode, in S509, the wiper fail-safe mode providing system 200 may continue operating the wiper 160.

When it is not determined that the wiper switch 140 is in the low mode after 1 minute, in S510, the wiper fail-safe mode providing system 200 may output guidance on the contents "Please stop the wiper as the wiper switch does not change to the low mode." and may stop the wiper 160.

Here again, the numerical value called "1 minute" is used for illustration but may be a value set randomly. The numerical value may be determined as a difference numerical value or may be determined by being received from a user, when actually implemented.

Herein, the contents "Please stop the wiper as the wiper switch does not change to the low mode" are included as text merely for illustration. The text may include at least one of the contents that the wiper switch 140 does not change to the low mode within a certain time and the contents that the wiper 160 stops, when actually implemented.

When the wiper switch 140 is in the auto mode and when it is determined that the rain sensor 170 fails, in S511, the wiper fail-safe mode providing system 200 may continue operating the wiper 160 for 1 minute in an operation mode of the wiper 160 before the failure.

Here again, the numerical value called "1 minute" is used for illustration but may be a value set randomly. The numerical value may be determined as a difference numerical value or may be determined by being received from a user, when actually implemented.

In an embodiment, when the signal of the rain sensor 170 is not transmitted to the wiper control module 150, the wiper fail-safe mode providing system 200 may identify a failure of the rain sensor 170.

After operating the wiper 160 for 1 minute in the operation mode of the wiper 160 before the failure, in S512, the wiper fail-safe mode providing system 200 may output a wiper failure guide pop-up of the contents "Please change the wiper switch to the low or high mode within 1 minute and visit the repair shop".

Here again, the numerical value called "1 minute" is used for illustration but may be a value set randomly. The numerical value may be determined as a difference numerical value or may be determined by being received from a user, when actually implemented.

Here again, the contents "Please change the wiper switch to the low or high mode within 1 minute and visit the repair shop" are included as text merely for illustration. The text may include at least one of contents requesting to change the wiper switch 140 to the low or high mode within a certain time and contents requesting to visit the A/S Center, when actually implemented.

Meanwhile, although not illustrated in the drawing, as another embodiment, the wiper fail-safe mode providing system 200 may first output the wiper failure guide pop-up of the contents "Please change the wiper switch to the low or high mode within 1 minute and visit the repair shop" in S512 and may then continue operating the wiper 160 for 1 minute in the operation mode of the wiper 160 before the failure in S511, or may proceed with the two processes at the same time.

After outputting the wiper failure guide pop-up, in S513, the wiper fail-safe mode providing system 200 may determine whether the wiper switch 140 is in the low or high mode.

When it is determined that the wiper switch 140 in in the low or high mode, in S514, the wiper fail-safe mode providing system 200 may continue operating the wiper 160.

When it is not determined that the wiper switch 140 is in the low or high mode until 1 minute later, in S515, the wiper fail-safe mode providing system 200 may output guidance on the contents "Please stop the wiper as the operation mode of the wiper does not change to the low or high mode" and may stop the wiper 160.

Here again, the numerical value called "1 minute" is used for illustration but may be a value set randomly. The numerical value may be determined as a difference numerical value or may be determined by being received from a user, when actually implemented.

Here again, the contents "Please stop the wiper as the operation mode of the wiper does not change to the low or high mode" are included as text merely for illustration. The text may include at least one of the contents that the operation mode of the wiper 160 does not change to the low or high mode within a certain time and the contents that the wiper 160 stops, when actually implemented.

Figure 6:
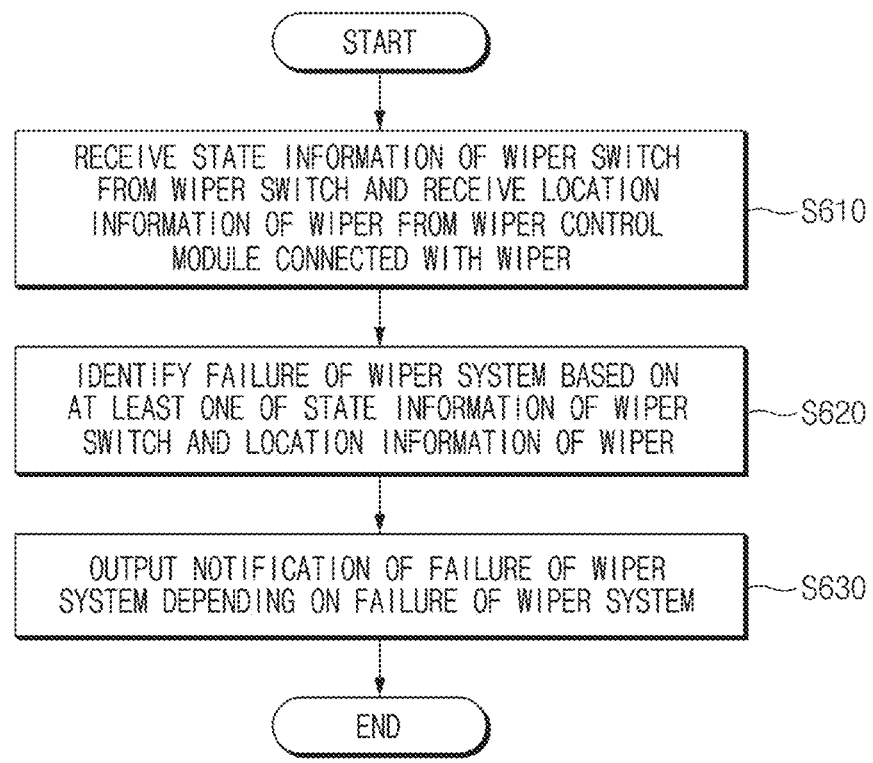
FIG. 6 is a flowchart illustrating a wiper fail-safe mode providing method according to an embodiment of the present disclosure.

FIG. 6 is a flowchart illustrating a method for providing a wiper fail-safe mode, i.e., a wiper fail-safe mode providing method according to an embodiment of the present disclosure.

Referring to FIG. 6, the wiper fail-safe mode providing method may include receiving (S610) state information of a wiper switch 140 from the wiper switch 140 and receiving location information of a wiper 160 from a wiper control module 150 connected with the wiper 160.

As an example, when the wiper switch 140 transmits the state information of the wiper switch 140 to the wiper control module 150 through CAN communication, the wiper fail-safe mode providing method may be to receive the information.

As an example, the wiper fail-safe mode providing method may be to receive at least one of the state information of the wiper switch 140 or the location information of the wiper 160 at intervals of 200 ms.

Herein, the numerical value called "200 ms" is used for illustration but may be a value set randomly. The numerical value may be determined as a difference numerical value, when actually implemented.

The wiper fail-safe mode providing method may further include identifying (S620) a failure of a wiper system based on at least one of the state information of the wiper switch 140 or the location information of the wiper 160, after receiving (S610) the state information of the wiper switch 140 from the wiper switch 140 and receiving the location information of the wiper 160 from the wiper control module 150 connected with the wiper 160.

As an example, the wiper fail-safe mode providing method may identify the failure of the wiper system, including: a failure of an MF SW; an open circuit of a CAN line; a short circuit of the CAN line; connector contact failure of the CAN line; a failure of a BCM; an open circuit of a LIN line; a short circuit of the LIN line; connector contact failure of the LIN line; a failure of a rain sensor 170; or connector contact failure of the rain sensor 170.

As an example, when the state information of the wiper switch 140 is not received and when another CAN communication message is normally received, the wiper fail-safe mode providing method may be to identify the failure of the wiper system. In this case, the wiper fail-safe mode providing method may be to determine a failure cause as a software problem of a transceiver of CAN communication or a hardware problem of the transceiver.

As internal processing of the vehicle, the wiper fail-safe mode providing method may be to request, by the BCM, the wiper switch 140 to reset at least one of software or an element associated with the transceiver of the CAN communication.

Furthermore, the wiper fail-safe mode providing method may include at least one of guidance attempting or requesting to recover communication because communication between the wiper switch 140 and a controller is not smooth, guidance requesting to adjust the wiper switch 140 to a low mode when the communication is not recovered after resetting, or guidance requesting to visit the A/S Center, which is contents of a notification of wiper failure.

As an example, the wiper fail-safe mode providing method may be to identify the failure of the wiper system, when it is impossible to perform CAN communication. In this case, the wiper fail-safe mode providing method may be to determine a failure cause as at least one of connector (MF SW or BCM) contact failure or an open circuit/short circuit of a CAN communication line.

The wiper fail-safe mode providing method may include at least one of guidance requesting to adjust the wiper switch 140 to the low mode, because communication between the wiper switch 140 and the controller is not smooth, or guidance requesting to visit the A/S Center, which is content of a notification of wiper failure.

As an example, the wiper fail-safe mode providing method may be to identify the failure of the wiper system, when it is impossible to perform LIN communication. In this case, the wiper fail-safe mode providing method may be to determine a failure cause as at least one of connector contact failure of the BCM or an open circuit/short circuit of a LIN line.

As internal processing of the vehicle, the wiper fail-safe mode providing method may be to transmit the contents that it is impossible to perform the LIN communication to the wiper fail-safe mode providing apparatus, by means of a CAN message of the BCM.

Furthermore, the wiper fail-safe mode providing method may include at least one of guidance requesting to adjust the wiper switch 140 to the low mode, because communication between a wiper controller and a motor is not smooth, or guidance requesting to visit the A/S Center, which is content of a notification of wiper failure.

As an example, when the BCM does not receive the transmission signal of the rain sensor 170 through the LIN communication and normally receives a LIN signal of the wiper 160, the wiper fail-safe mode providing method may be to identify the failure of the wiper system.

In this case, the wiper fail-safe mode providing method may be to determine a failure cause as at least one of connector contact failure of the rain sensor 170, an open circuit of a LIN line of the rain sensor 170, or LIN communication software/hardware of a controller of the rain sensor 170.

As internal processing of the vehicle, the wiper fail-safe mode providing method may be to request, by the BCM, the rain sensor 170 to reset at least one of software or an element associated with the LIN communication.

Furthermore, the wiper fail-safe mode providing method may include at least one of guidance attempting to recover communication because an operation of the rain sensor 170 is not smooth, guidance requesting to change the wiper switch 140 to the low or high mode when the wiper switch 140 is in an auto mode, when the communication is not recovered after resetting, or guidance requesting to visit the A/S Center, which is contents of a notification of wiper failure.

As an example, when it is impossible for the BCM to transmit a CAN message for location information of the wiper 160 and when another CAN message is normally transmitted, the wiper fail-safe mode providing method may be to identify the failure of the wiper system.

In this case, the wiper fail-safe mode providing method may be to determine a failure cause as at least one of a software problem of the transceiver of CAN communication or a hardware problem of the transceiver.

As internal processing of the vehicle, the wiper fail-safe mode providing method may be to attempt to perform at least one of resetting or recovering the transceiver by a time determined in the BCM itself.

Furthermore, the wiper fail-safe mode providing method may include at least one of guidance requesting to attempt to recover communication because a communication module of the wiper controller is not smooth, guidance requesting to adjust the wiper switch 140 to the low mode when the communication is not recovered after resetting, or guidance requesting to visit the A/S Center, which is contents of a notification of wiper failure.

Identifying (S620) the failure of the wiper system based on the at least one of the state information of the wiper switch 140 or the location information of the wiper 160 may include identifying the failure of the wiper system, depending on at least one of whether the state information of the wiper switch 140 is periodically received, whether it is impossible to receive the state information, or whether the location information of the wiper 160 is periodically received.

As an example, identifying the failure of the wiper system depending on the at least one of whether the state information of the wiper switch 140 is periodically received, whether it is impossible to receive the state information, or whether the location information of the wiper 160 is periodically received may include identifying the failure, when at least one of the state information of the wiper switch 140 or the location information of the wiper 160 is not received at intervals of 200 ms.

Here again, the numerical value called "200 ms" is used for illustration but may be a value set randomly. The numerical value may be determined as a difference numerical value, when actually implemented.

The wiper fail-safe mode providing method may further include obtaining failure information of the rain sensor 170. Identifying (S620) the failure of the wiper system based on the least one of the state information of the wiper switch 140 or the location information of the wiper 160 may include identifying the failure of the wiper system based on the failure information of the rain sensor 170.

The wiper fail-safe mode providing method may include outputting (S630) a notification of the failure of the wiper system, depending on the failure of the wiper system, after identifying (S620) the failure of the wiper system based on the least one of the state information of the wiper switch 140 or the location information of the wiper 160.

Outputting (S630) the notification of the failure of the wiper system depending on the failure of the wiper system may include outputting a notification including the contents that it is possible for the wiper system to operate only in the low operation mode, when the failure of the wiper system is identified in a state where the wiper does not operate. Outputting the notification may further include outputting a notification including contents requesting to change an operation mode within a certain time when the operation mode of the wiper 160 is not the low mode, when the failure of the wiper system is identified in a state where the wiper 160 operates.

When the failure of the wiper system is identified, the wiper fail-safe mode providing method may include controlling the wiper 160 to operate in an operation mode of the wiper 160 before the failure during a certain time.

When the failure of the wiper system is identified in the state where the wiper 160 operates, when the operation mode of the wiper 160 is not the low mode, and when there is no change in the operation mode during a certain time, the wiper fail-safe mode providing method may further include outputting a notification including the contents that the wiper 160 stops because there is no change in operation mode and stopping the wiper 160.

A description is given of effects of the wiper fail-safe mode providing apparatus, the system having the same, and the method thereof.

According to at least one of the embodiments of the present disclosure, the wiper fail-safe mode providing apparatus, the system having the same, and the method thereof may be provided to identify a failure of the wiper system based on at least one of state information of the wiper switch, location information of the wiper, failure information of the rain sensor, or failure information of communication.

Furthermore, according to at least one of the embodiments of the present disclosure, the wiper fail-safe mode providing apparatus, the system having the same, and the method thereof may be provided to control the wiper to operate in an operation mode of the wiper before the failure during a certain time, when the failure of the wiper system is identified.

Furthermore, according to at least one of the embodiments of the present disclosure, the wiper fail-safe mode providing apparatus, the system having the same, and the method thereof may be provided to output a notification including the contents that it is possible for the wiper system to operate only in a low operation mode, when the failure of the wiper system is identified in a state where the wiper does not operate.

Furthermore, according to at least one of the embodiments of the present disclosure, the wiper fail-safe mode providing apparatus, the system having the same, and the method thereof may be provided to output a notification including contents requesting to change an operation mode of the wiper within a certain time, when the failure of the wiper system is identified in a state where the wiper operates and when the operation mode of the wiper is not the low mode.

In addition, various effects ascertained directly or indirectly through the present disclosure may be provided.

Hereinabove, although the present disclosure has been described with reference to specific embodiments and the accompanying drawings, the present disclosure is not limited thereto. The embodiments may be variously modified and altered by those having ordinary skill in the art to which the present disclosure pertains without departing from the spirit and scope of the present disclosure claimed in the following claims.

Therefore, the specific embodiments of the present disclosure are provided to explain the spirit and scope of the present disclosure, but not to limit them, so that the spirit and scope of the present disclosure is not limited by the embodiments. The scope of the present disclosure should be construed on the basis of the accompanying claims. All the technical ideas within the scope equivalent to the claims should be included in the scope of the present disclosure.

What is claimed is:

1. An apparatus providing a wiper failure notification, the apparatus comprising:
 a communication device configured to receive state information of a wiper switch from the wiper switch and receive location information of a wiper from a body control module (BCM) connected with the wiper;
 a controller configured to identify a failure of a wiper system based on at least one of the state information of the wiper switch or the location information of the wiper, the state information and the location information being received by the communication device; and
 a notification device configured to output a notification of the failure of the wiper system, depending on the failure of the wiper system,
 wherein the controller is configured to
  output a notification including contents that it is possible for the wiper system to operate only in a low operation mode, via the notification device, when the failure of the wiper system is identified in a state where the wiper does not operate, and
  output a notification including instructions to request to change an operation mode of the wiper within a certain time, via the notification device when the operation mode of the wiper is not a low mode, when the failure of the wiper system is identified in a state where the wiper operates.

2. The apparatus of claim 1, wherein the notification device includes at least one of an instrument cluster or an audio, video, and navigation (AVN) system.

3. The apparatus of claim 1, wherein the controller identifies the failure of the wiper system, depending on at least one of whether the state information of the wiper switch is periodically received via the communication device, whether it is impossible to receive the state information via the communication device, or whether the location information of the wiper is periodically received via the communication device.

4. The apparatus of claim 1, wherein the controller transmits a command including instructions to control the wiper to operate in an operation mode of the wiper before the failure during a certain time to the body control module (BCM) via the communication device, when the failure of the wiper system is identified.

5. The apparatus of claim 1, wherein the controller outputs a notification including contents that the wiper stops because there is no change in the operation mode, via the notification device when there is no change in the operation mode during the certain time, when the failure of the wiper system is identified in the state where the wiper operates and when the operation mode of the wiper is not the low mode, and transmits a command including instructions to stop the wiper to the body control module (BCM), via the communication device.

6. A system providing a wiper failure notification, the system comprising:
 a body control module (BCM) configured to be connected with at least one of a wiper or a rain sensor and output at least one of location information of the wiper or failure information of the rain sensor; and
 an apparatus providing the failure notification and configured to identify a failure of a wiper system based on at least one of state information of a wiper switch, the state information being received from the wiper switch, the location information of the wiper, the location information being received from the body control module (BCM), or the failure information of the rain sensor and output a notification of the failure of the wiper system,
 wherein the apparatus providing a wiper failure notification is configured to
  output a notification including contents that it is possible for the wiper system to operate only in a low operation mode, when the failure of the wiper system is identified in a state where the wiper does not operate, and
  output a notification including instructions to request to change an operation mode of the wiper within a certain time when the operation mode of the wiper is not a low mode, when the failure of the wiper system is identified in a state where the wiper operates.

7. The system of claim 6, wherein the body control module (BCM) outputs failure information regarding communication in relation to at least one of the wiper or the rain sensor, and
 wherein the apparatus identifies the failure of the wiper system depending on the failure information of the communication.

8. The system of claim 6, wherein the apparatus identifies the failure of the wiper system, depending on at least one of whether the state information of the wiper switch is periodically received, whether it is impossible to receive the state information, or whether the location information of the wiper is periodically received.

9. The system of claim 6, wherein the body control module (BCM) controls the wiper to operate in an operation mode of the wiper before the failure and for a certain duration of time, prior to the failure of the wiper system being identified.

10. The system of claim 6, wherein the apparatus outputs a notification including the instructions to request to change the operation mode to the low mode or a high mode, when a failure of the rain sensor is identified and when the operation mode is an auto mode.

11. The system of claim 6, wherein the apparatus outputs a notification including the instructions to request to change the operation mode to the low mode, when a failure of the rain sensor is not identified.

12. The system of claim 6, wherein the apparatus outputs a notification including contents that the wiper stops because there is no change in the operation mode, when there is no change in the operation mode during the certain time, and
 wherein the body control module (BCM) stops the wiper, when there is no change in the operation mode during the certain time.

13. A method providing a wiper failure notification, the method comprising:
 receiving state information of a wiper switch from the wiper switch and receiving location information of a wiper from a body control module (BCM) connected with the wiper;
 identifying a failure of a wiper system based on at least one of the state information of the wiper switch or the location information of the wiper; and
 outputting a notification of the failure of the wiper system, depending on the failure of the wiper system,
 wherein the outputting of the notification of the failure of the wiper system depending on the failure of the wiper system includes
  outputting a notification including contents that it is possible for the wiper system to operate only in a low operation mode, when the failure of the wiper system is identified in a state where the wiper does not operate, and outputting a notification including instructions to request to change an operation mode of the wiper within a certain time when the operation mode of the wiper is not a low mode, when the failure of the wiper system is identified in a state where the wiper operates.

14. The method of claim 13, wherein the identifying of the failure of the wiper system based on the at least one of the state information of the wiper switch or the location information of the wiper includes:

identifying the failure of the wiper system, depending on at least one of whether the state information of the wiper switch is periodically received, whether it is impossible to receive the state information, or whether the location information of the wiper is periodically received.

15. The method of claim 13, further comprising:

controlling the wiper to operate in an operation mode of the wiper before the failure fora certain duration of time, prior to the failure of the wiper system being identified.

16. The method of claim 13, further comprising:

obtaining failure information of a rain sensor, wherein the identifying of the failure of the wiper system based on the at least one of the state information of the wiper switch or the location information of the wiper includes:

identifying the failure of the wiper system based on failure information of the rain sensor.

17. The method of claim 13, further comprising:

outputting a notification including contents that the wiper stops because there is no change in the operation mode, when there no change in the operation mode during the certain time, when the failure of the wiper system is identified in the state where the wiper operates and when the operation mode of the wiper is not the low mode, and stopping the wiper.

* * * * *